(12) United States Patent
Chen et al.

(10) Patent No.: US 11,843,482 B2
(45) Date of Patent: Dec. 12, 2023

(54) MULTIPATH SEPARATION METHOD AND DEVICE, AND STORAGE MEDIUM

(71) Applicant: ZTE CORPORATION, Shenzhen (CN)

(72) Inventors: Shijun Chen, Shenzhen (CN); Yuanyuan Wang, Shenzhen (CN); Dawei Chen, Shenzhen (CN); Cheng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 156 days.

(21) Appl. No.: 17/436,959

(22) PCT Filed: Mar. 6, 2020

(86) PCT No.: PCT/CN2020/078246
§ 371 (c)(1),
(2) Date: Sep. 7, 2021

(87) PCT Pub. No.: WO2020/177766
PCT Pub. Date: Sep. 10, 2020

(65) Prior Publication Data
US 2022/0173940 A1    Jun. 2, 2022

(30) Foreign Application Priority Data
Mar. 7, 2019    (CN) .......................... 201910172473.2

(51) Int. Cl.
*H04L 25/02* (2006.01)
*H04L 27/26* (2006.01)

(52) U.S. Cl.
CPC ........ *H04L 25/0248* (2013.01); *H04L 25/022* (2013.01); *H04L 25/0224* (2013.01); *H04L 27/2672* (2013.01)

(58) Field of Classification Search
CPC .. H04B 1/10; H04B 1/707; H04B 7/26; H04L 25/02; H04L 25/022; H04L 25/0224;
(Continued)

(56) References Cited

U.S. PATENT DOCUMENTS

| 6,493,380 B1 | 12/2002 | Wu et al. |
| 2012/0099435 A1* | 4/2012 | Barbotin ............ H04L 25/0204 370/241 |
| 2015/0263869 A1 | 9/2015 | Quick et al. |

FOREIGN PATENT DOCUMENTS

| CN | 103200136 A | 7/2013 |
| CN | 108933745 A | 12/2018 |

(Continued)

OTHER PUBLICATIONS

Qualcomm Incorporated et al. "3GPP TSG RAN WG1 Meeting #63bis R1-110594" System simulation assumption for closed loop transmit diversity, Jan. 21, 2011 (Jan. 21, 2011) whole document.
(Continued)

*Primary Examiner* — Shawkat M Ali
(74) *Attorney, Agent, or Firm* — George McGuire

(57) ABSTRACT

Provided are a multipath separation method and device, and a storage medium. The multipath separation method includes: extracting frequency domain response characteristics of received reference signals in at least two different frequency bands; for each of the at least two different frequency bands, constructing a Toeplitz matrix; combining Toeplitz matrixes corresponding to the at least two different frequency bands; performing singular value decomposition on the synthesized Toeplitz matrix; determining a signal space matrix and a noise space matrix according to the decomposed matrix; constructing a plurality of frequency domain response vectors according to frequency domain response characteristics of local signals having different delays and are the same as the received reference signals;
(Continued)

and comparing a first preset threshold with inner products between each of the plurality of frequency domain response vectors and the noise space matrix respectively, and determining a delay corresponding to each of a plurality of frequency domain response vectors in which inner products satisfy the first preset threshold to be a delay of one path in the multipath.

19 Claims, 4 Drawing Sheets

(58) Field of Classification Search
CPC ..... H04L 25/0248; H04L 27/00; H04L 27/06; H04L 27/12; H04L 27/26; H04L 27/2672; H04W 24/08; H04W 64/00
USPC ........ 370/203, 210, 242; 375/130, 224, 260, 375/262, 267, 340, 350
See application file for complete search history.

(56) References Cited

FOREIGN PATENT DOCUMENTS

CN 110535801 A 12/2019
EP 2211512 A1 7/2010

OTHER PUBLICATIONS

International Search Report and Written Opinion for International Application PCT/CN202/078246. Mailing date of search report, dated May 27, 2020.
"Estimation of Sparse MIMO Channels with Common Support" Yann Barbotin, et al. Jul. 7, 2011.
European Search Report, dated Oct. 24, 2022. pp. 1-11.

* cited by examiner

MULTIPATH SEPARATION METHOD AND DEVICE, AND STORAGE MEDIUM

CROSS REFERENCE TO RELATED APPLICATIONS

This is a national stage application filed under 37 U.S.C. 371 based on International Patent Application No. PCT/CN2020/078246, filed Mar. 6, 2020, which claims priority to Chinese Patent Application No. 201910172473.2 filed with the China National Intellectual Property Administration (CNIPA) on Mar. 7, 2019, the disclosure of which are incorporated herein by reference in their entireties.

TECHNICAL FIELD

The present application relates to the field of wireless communication networks, for example, to a multipath separation method and device, and a storage medium.

BACKGROUND

Positioning function has become the standard configuration of portable terminal equipment. Indoors or in dense urban regions, satellite positioning technology cannot complete positioning due to the failure of searching enough satellite signals, but the coverage environment of the cellular network is better than the coverage environment of satellite signals, so that the positioning technology with the assistance of the cellular network has been widely used.

However, the non-line-of-sight (NLOS), multipath, and other factors will affect the positioning accuracy of the cellular network. Therefore, multipath separation is required during the positioning by using the cellular network. A multiple signal classification (MUSIC) algorithm is used for multipath separation processing. The MUSIC algorithm has a high degree of multipath recognition under ideal conditions. However, due to the problem of noise sensitivity of the MUSIC algorithm, the multipath recognition of the MUSIC algorithm deteriorates seriously in a noisy environment, which leads to the failure of the multipath separation.

Cellular networks are all orthogonal frequency division multiplexing (OFDM) systems. Because of the existence of zero frequency in OFDM systems, the uniformity of signal distribution in the frequency domain is destroyed, which affects the noise adaptability of the MUSIC algorithm when performing the multipath separation.

SUMMARY

The present application provides a multipath separation method and device, and a storage medium, which can improve the noise adaptability to multipath separation.

An embodiment of the present application provides a multipath separation method. The method includes the steps described below.

Frequency domain response characteristics of received reference signals in at least two different frequency bands are extracted.

For each of the at least two different frequency bands, a Toeplitz matrix is constructed according to frequency domain response characteristics of a reference signal in the respective frequency band, where a size of the Toeplitz matrix for each of the at least two different frequency bands is determined according to the number of sub-carriers contained in the respective one of the at least two different frequency bands, and Toeplitz matrixes for the at least two different frequency bands have the same number of rows.

The Toeplitz matrixes corresponding to the at least two different frequency bands are combined into one synthesized Toeplitz matrix.

Singular value decomposition is performed on the synthesized Toeplitz matrix, and a signal space matrix and a noise space matrix are determined according to the decomposed matrix.

A plurality of frequency domain response vectors are constructed according to frequency domain response characteristics of local signals having a plurality of different delays, where the local signals are the same as the received reference signals.

A first preset threshold is compared with inner products between each of the plurality of frequency domain response vectors and the noise space matrix respectively, and a delay corresponding to each of a plurality of frequency domain response vectors in which inner products satisfy the first preset threshold is determined to be a delay of one path in multipath.

An embodiment of the present application provides a multipath separation device. The device includes a characteristic extraction module, a matrix construction module, a matrix combination module, a matrix decomposition module, a vector construction module, and a multipath separation module.

The characteristic extraction module is configured to extract frequency domain response characteristics of received reference signals in at least two different frequency bands.

The matrix construction module is configured to, for each of the at least two different frequency bands, construct a Toeplitz matrix according to frequency domain response characteristics of a reference signal in the respective frequency band, where a size of the Toeplitz matrix for each of the at least two different frequency bands is determined according to the number of sub-carriers contained in the respective one of the at least two different frequency bands, and Toeplitz matrixes for the at least two different frequency bands have the same number of rows.

The matrix combination module is configured to combine the Toeplitz matrixes corresponding to the at least two different frequency bands into one synthesized Toeplitz matrix.

The matrix decomposition module is configured to perform singular value decomposition on the synthesized Toeplitz matrix, and determine a signal space matrix and a noise space matrix according to the decomposed matrix.

The vector construction module is configured to construct a plurality of frequency domain response vectors according to frequency domain response characteristics of local signals having a plurality of different delays, where the local signals are the same as the received reference signals.

The multipath separation module is configured to compare a first preset threshold with inner products between each of the plurality of frequency domain response vectors and the noise space matrix respectively, and determine a delay corresponding to each of a plurality of frequency domain response vectors in which inner products satisfy the first preset threshold to be a delay of one path in multipath.

An embodiment of the present application provides a storage medium. The storage medium has a computer program stored thereon, where the computer program, when executed by a processor, implements the multipath separation method described in any one of the embodiments of the present application.

DETAILED DESCRIPTION

Figure 1:
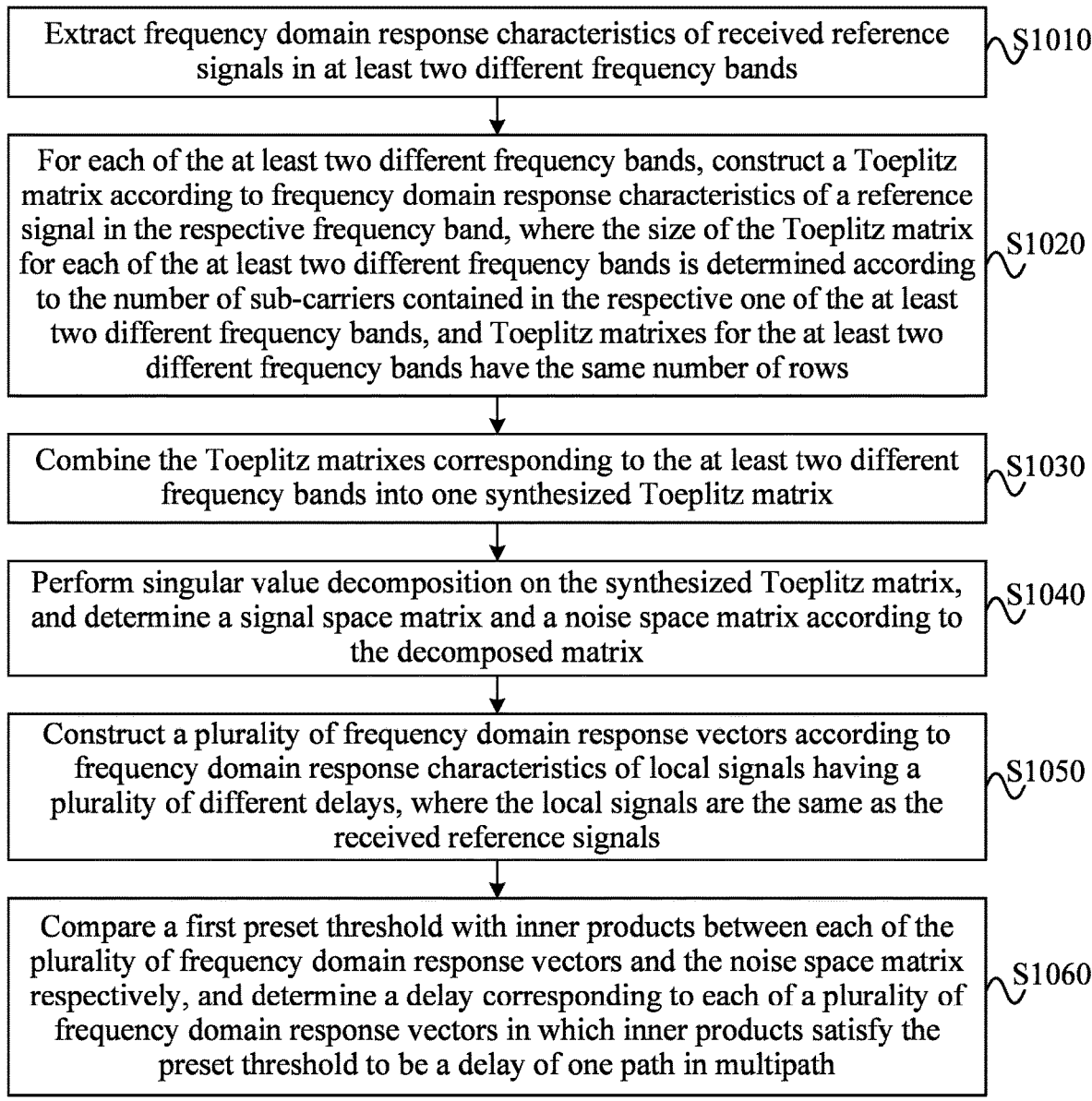
FIG. 1 is a flowchart of a multipath separation method according to an embodiment.

Embodiments of the present application are described hereinafter in detail with reference to the drawings. It is to be noted that if not in collision, the embodiments and features therein in the present application may be combined with each other.

The traditional positioning technology is satellite positioning technology, in which a satellite positioning chip set in a terminal receives signals transmitted by multiple positioning satellites and then the calculation is performed on these signals transmitted by multiple positioning satellites, so as to achieve the positioning. Such satellite positioning technology includes Global Positioning System (GPS), Global Navigation Satellite System (GLONASS), BeiDou Navigation Satellite System, and the like, all of which have been widely used in terminal equipment. However, in indoor or dense urban regions, due to the large attenuation of satellite signals, the precision and speed of satellite positioning are affected, and even a sufficient number of satellite signals may not be searched, resulting in the failure of positioning.

With the development of mobile communication technology, the coverage of the cellular network has been significantly improved, and thus the positioning technology with the assistance of the cellular communication network has appeared. However, due to many factors, the propagation of wireless signals of the cellular communication network in space regions results in wireless signals transmitted from the transmitting end reaching the receiving end through multiple paths. Since the signals arriving at the receiving end through multiple paths have different delays, when the signals received through multiple paths are synthesized, the signals received through multiple paths influence each other, causing signal distortion, which is the multipath effect of electromagnetic waves. In order to solve the multipath effect, it is necessary to perform multipath separation on the received signals.

The traditional multipath separation may be performed by using some specific algorithms, such as the MUSIC algorithm. The MUSIC algorithm has a high degree of multipath recognition in ideal cases and can identify multipath whose delay interval is far less than the sampling period. However, due to the problem of noise sensitivity of the MUSIC algorithm, in noisy environment, the multipath recognition of the MUSIC algorithm deteriorates seriously, the width of the path widens, and the multipath overlaps each other, which leads to the failure of multipath separation. Cellular communication networks, such as the fourth generation mobile communication system (4G) and fifth generation mobile communication system (5G), are all OFDM systems. Because of the existence of zero frequency in OFDM systems, the uniformity of signal distribution in the frequency domain is destroyed, which leads to the inability to make full use of all bandwidth when multipath separation is performed by using the MUSIC algorithm, thereby affecting the noise adaptability of the MUSIC algorithm when performing multipath separation.

In an embodiment of the present application, a multipath separation method is provided, which overcomes the discontinuity problem caused by frequency domain resource segmentation due to zero frequency in the OFDM system, thereby improving the noise adaptability to multipath separation and improving the multipath separation precision.

FIG. 1 is a flowchart of a multipath separation method according to an embodiment. As shown in FIG. 1, the method provided by this embodiment includes the steps described below.

In S1010, frequency domain response characteristics of received reference signals in at least two different frequency bands are extracted.

Multipath separation is applied to the receiving end of wireless signals. After the transmitting end of wireless signals transmits the wireless signals to the receiving end, the wireless signals may arrive at the receiving end through multiple paths due to the influence of various factors in the environmental space. For the receiving end, the arrival time of the signals received through multiple paths is different, which may affect the synthesis of wireless signals. Then for the receiving end, it is necessary to determine the delays of multiple paths, so as to separate multiple paths in the environmental space, that is, to perform the multipath separation.

In a wireless communication system, when a transmitting end and a receiving end of wireless signals perform the transmission of wireless signals, the transmitting end and the receiving end need to transmit a variety of reference signals, such as sounding reference signals (SRSs), cell reference signals (CRSs), demodulation reference signals (DMRSs), positioning reference signals (PRSs), and the like. The variety of reference signals transmitted by the transmitting end exist in the receiving end. The receiving end can obtain a variety of parameters of the wireless channel by analyzing the received reference signals and then apply the parameters to the reception of data. When there is multipath in the space region, the signals received by the receiving end contain reference signals received through multiple different paths, and the receiving end needs to analyze the received reference signals to achieve multipath separation. For the OFDM system, because of the existence of zero frequency, the signals are not continuous in the frequency domain, and thus the receiving end receives two segments of discontinuous reference signals in the frequency domain, and these two segments of reference signals are of the same frequency. In addition, the wireless communication system may also be multi-frequency, that is, besides the influence of zero frequency, reference signals may be transmitted through multiple different frequency bands, and thus the receiving end may receive two or more segments of discontinuous reference signals in the frequency domain, and these reference signals may be of the same frequency or different frequencies. In addition, the wireless communication system may also be multi-frequency, that is, besides the influence of zero frequency, reference signals may be transmitted through multiple different frequency bands, and thus the receiving end may receive two or more segments of discontinuous reference signals in the frequency domain, and these reference signals may be of the same frequency or different frequencies.

For multipath separation in the wireless communication system, in fact, the received reference signals are analyzed by using the correlation characteristics of multiple sub-carrier signals in the frequency band, so as to achieve multipath separation. If the received reference signals are discontinuous in the frequency domain, the processing ability of multipath separation is affected, which greatly affects the precision when the multipath separation method is applied to the OFDM system. This embodiment of the present application makes an improvement for the case in which the received signals are discontinuous in the frequency domain. The received reference signals in multiple different frequency bands are combined, so as to improve the processing ability of multipath separation and achieve the purpose of improving the multipath separation precision. The multipath separation method provided by this embodiment of the present application can be applied to a wireless communication system such as the OFDM system in which the received signals are discontinuous in the frequency domain due to the presence of zero frequency, or to a wireless communication system in which the received signals are discontinuous in the frequency domain due to other reasons, such as a multi-frequency wireless communication system.

After reference signals in at least two different frequency bands are received, the received reference signals in at least two different frequency bands need to be processed to extract frequency domain response characteristics of the received reference signals in at least two different frequency bands. In this embodiment, the frequency domain response characteristics are correlation characteristics of signals changing with frequencies, including but not limited to channel characteristics, power characteristics, correlation characteristics, and the like. For each frequency band, there are multiple sub-carriers included in the frequency domain, and then for each frequency band, the extracted frequency domain response characteristics actually include frequency domain response characteristics of multiple sub-carriers of reference signals in each frequency band.

In step S1020, for each of the at least two different frequency bands, a Toeplitz matrix is constructed according to frequency domain response characteristics of a reference signal in the respective frequency band, where a size of the Toeplitz matrix for each of the at least two different frequency bands is determined according to the number of sub-carriers contained in the respective one of the at least two different frequency bands, and Toeplitz matrixes for the at least two different frequency bands have the same number of rows.

After the frequency domain response characteristics of the reference signal in each of the at least two frequency bands are extracted, a Toeplitz matrix for each of the at least two frequency bands needs to be constructed. The Toeplitz matrix is referred to as a T-shaped matrix for short, in which elements on the main diagonal of the Toeplitz matrix are equal, and elements on the lines parallel to the main diagonal are also equal. Multiple elements in the Toeplitz matrix are symmetric about secondary diagonals, that is, the Toeplitz matrix is a sub-symmetric matrix. A simple Toeplitz matrix includes a forward displacement matrix and a backward displacement matrix.

The size of the Toeplitz matrix for each of the at least two different frequency bands is determined according to the number of sub-carriers contained in respective one of the at least two different frequency bands, and the product of the number of rows and the number of columns of the Toeplitz matrix corresponding to each of the at least two frequency bands is approximately equal to the number of sub-carriers contained in the each of the at least two frequency bands.

Moreover, Toeplitz matrixes corresponding to the at least two different frequency bands have the same number of rows. For example, if the received reference signal includes i frequency bands, then the Toeplitz matrix corresponding to each frequency band is a matrix $M \times N_i$, where M is rows of $T_{M \cdot N_i}$, $N_i$ is columns of $T_{M \cdot N_i}$, i is a frequency band identifier and $i \in (1, \ldots, t)$, t is the number of frequency bands, and M and $N_i$ are determined according to the number of sub-carriers in a frequency band i. For the frequency band i, the Toeplitz matrix corresponding to the frequency band i is $T_{M \cdot N_i}$, for example:

$$T_{M \times N_1} = \begin{bmatrix} H(\omega^i_{N_1}) & \ldots & H(\omega^i_2) & H(\omega^i_1) \\ H(\omega^i_{N_1+1}) & \ldots & H(\omega^i_3) & H(\omega^i_2) \\ \ldots & \ldots & \ldots & \ldots \\ H(\omega^i_{N_1+M}) & \ldots & H(\omega^i_{M+1}) & H(\omega^i_M) \end{bmatrix}$$

In this embodiment, M is determined according to the multipath estimation capability of the receiving end, and in general, M is less than $N_i$, where $i \in (1, \ldots, t)$, and t is the number of frequency bands.

In step S1030, the Toeplitz matrixes corresponding to the at least two different frequency bands are combined into one synthesized Toeplitz matrix.

In the traditional multipath separation method, the MUSIC algorithm is used to process the frequency domain response characteristics corresponding to each of the multiple frequency bands. However, since multiple frequency bands of the received signal are separated, the MUSIC algorithm cannot make full use of the frequency domain response characteristics of the whole frequency band of the received signal, which affects the noise adaptability to multipath separation. In an embodiment of the present application, after Toeplitz matrixes corresponding to at least two different frequency bands are obtained, the Toeplitz matrixes corresponding to at least two different frequency bands are combined. In this way, Toeplitz matrixes corresponding to multiple frequency bands are combined into a synthesized Toeplitz matrix, and then the synthesized Toeplitz matrix represents the frequency domain response characteristics of all frequency bands of the received signal, which is equivalent to increasing the bandwidth of the signal to be analyzed. When the synthesized Toeplitz matrix is analyzed, a larger bandwidth can be used, thereby improving the noise adaptability to multipath separation.

Since the number of rows of the Toeplitz matrixes corresponding to at least two different frequency bands is the same, the method for combining the Toeplitz matrixes corresponding to at east two different frequency bands is as follows: $T_{M \cdot N} = [T_{M \cdot N_1} \ldots T_{M \cdot N_2} \, T_{M \cdot N_t}]$, where $T_{M \cdot N}$ represents the synthesized Toeplitz matrix, and $T_{M \cdot N_1}$, $T_{M \cdot N_2}$, and $T_{M \cdot N_t}$, respectively represent the Toeplitz matrixes corresponding to multiple frequency bands. Then, the synthesized Toeplitz matrix $T_{M \cdot N}$ can be expressed as:

$$T_{M \times N} = \begin{bmatrix} \ldots & H(\omega_{N_2}^2) & \ldots & H(\omega_1^2) & H(\omega_{N_1}^1) & \ldots & H(\omega_{N_1}^1) \\ \ldots & H(\omega_{N_2+1}^2) & \ldots & H(\omega_2^2) & H(\omega_{N_1+1}^1) & \ldots & H(\omega_2^1) \\ \ldots & \ldots & \ldots & \ldots & \ldots & \ldots & \ldots \\ \ldots & H(\omega_{N_2+M}^2) & \ldots & H(\omega_M^2) & H(\omega_{N_1+M}^1) & \ldots & H(\omega_M^1) \end{bmatrix}$$

The synthesized Toeplitz matrix is an M×N matrix, where $N = N_1 + N_2 + \ldots + N_i$.

In step S1040, singular value decomposition is performed on the synthesized Toeplitz matrix, and a signal space matrix and a noise space matrix are determined according to the decomposed matrix.

Since the synthesized Toeplitz matrix represents the frequency domain response characteristics of the whole frequency band of the received reference signal, the signal characteristics of the received reference signal can be obtained by analyzing the synthesized Toeplitz matrix. In an embodiment, the processing method of analyzing the synthesized Toeplitz matrix to obtain the signal characteristics of the received reference signal is to perform singular value decomposition (SVD). Singular value decomposition can make a complex matrix to be represented as the multiplication of several smaller and simpler sub-matrixes, and these sub-matrixes describe important characteristics of the matrix.

The principle of singular value decomposition is as follows: assuming that the matrix A to be decomposed is an m×n matrix, then the SVD of the matrix A is defined as:

$$A = U\Sigma V^H$$

In the above formula, U is an m×m matrix, Σ is an m×n matrix in which except the elements on the main diagonal, elements are all 0, and each element on the main diagonal is called singular value, V is an n×n matrix, and $V^H$ is a conjugate matrix of V. U and V are both unitary matrices, that is, U and V satisfy $U^T U = I$ and $V^T V = I$.

The columns of the matrix U obtained after singular value decomposition form a set of orthonormal or analytic basis vectors of M. These vectors are the eigenvectors of MM*. The columns of the matrix V form a set of orthonormal basis vectors of M. These vectors are the eigenvectors of M*M. The elements on the diagonal of the matrix Σ are singular values, which can be regarded as the scaling on the scalars between input and output. These elements are the singular values of M*M and MM* and correspond to the column vectors of the matrix U and the matrix V. According to the meaning of frequency domain characteristics of wireless signals, $V^H$ may be decomposed into a signal space matrix V1 and a noise space matrix V0 according to the size of eigenvalues. The signal space matrix V1 refers to a matrix composed of a first group column vectors in $V^H$, the first group column vectors in the $V^H$ corresponds to eigenvalues which are in the matrix Σ and each of modulus values of which is greater than or equal to a second preset threshold, and the noise space matrix V0 refers to a matrix composed of a second group column vectors in, the second group column vectors in the $V^H$ corresponds to eigenvalues which are in the matrix Σ and each of modulus values of which is less than the second preset threshold. The modulus values of eigenvalues in the matrix Σ is determined according to the distribution of eigenvalues.

The singular value decomposition is performed on the synthesized Toeplitz matrix $T_{M \times N}$ obtained in this embodiment through $T_{M \times N} \overset{SVD}{\Longrightarrow} U\Sigma V^H$, where U is an M×M matrix, Σ is an M×N matrix, and $V^H$ is an N×N matrix. Then a matrix composed of a first group column vectors in $V^H$ is used as the signal space matrix, where the first group column vectors in the $V^H$ corresponds to eigenvalues which are in the matrix Σ and each of modulus values of which is greater than or equal to a second preset threshold, and a matrix composed of a second group column vectors in $V^H$ is used as the noise space matrix, where the second group column vectors in the $V^H$ corresponds to eigenvalues which are in the matrix Σ and each of modulus values of which is less than the second preset threshold.

In step S1050, a plurality of frequency domain response vectors are constructed according to frequency domain response characteristics of local signals having a plurality of different delays, where the local signals are the same as the received reference signals.

After the synthesized Toeplitz matrix is analyzed, the signal space matrix and noise space matrix are obtained, that is, the characteristics of signals and noise in the space region are analyzed through the received reference signals. Since the reference signals received by the wireless signal receiving end have original signals stored locally in the receiving end, the purpose of multipath separation is to determine which spatial paths through which the reference signals transmitted by the transmitting end arrive at the receiving end, and the time for the reference signals to arrive at the receiving end through different paths is different, that is, the reference signals have different delays. Then, whether the reference signals having different delays are existing signals can be determined by setting different delays for the original reference signals stored in the receiving end and using the orthogonality between the reference signals having different delays and the noise space vectors.

In an embodiment, firstly, multiple frequency domain response vectors need to be constructed according to the frequency domain response characteristics of local signals having multiple different delays, that is, multiple different delays are set for the local signals, then frequency domain response characteristics of the multiple delay signals are obtained respectively, and finally a frequency domain response vector corresponding to each delay signal is obtained, where the local signals are the same as the received reference signals. The length of the frequency domain response vector corresponding to each delay signal is the same as the length of each corresponding noise space vector. When frequency response vectors corresponding to different delay signals are constructed, the value of the delay is traversing multiple delays, and the interval of the multiple delays is determined according to the processing capacity of the system. Since the received reference signals are in multiple frequency bands, the local reference signals which are the same as the received reference signals are also in multiple frequency bands. After the frequency domain response vectors corresponding to multiple frequency bands are generated, the frequency domain response vectors in multiple frequency bands are synthesized into one synthesized frequency domain response vector.

For example, in this embodiment, since the decomposed matrix $V^H$ is an N×N matrix, a frequency domain response vector $L_\tau^i$ with a length of N and an arbitrary delay τ needs to be constructed for local signals in multiple frequency bands which are the same as the received reference signals, and then the characteristic response vectors in multiple frequency bands are combined into one synthesized frequency domain response vector.

$$L_\tau = [\ldots\ L_\tau^i\ \ldots\ L_\tau^1] = [\ldots\ L_\tau^{2,N_2}\ \ldots\ L_\tau^{2,1}\ L_\tau^{2,N_1}\ \ldots\ L_\tau^{1,N_1}]$$

In the above formula, $L^{i,j}_\tau$ is a frequency domain response having a delay of $\tau$ of a $j^{th}$ sub-carrier in an $i^{th}$ frequency band. $L^i_\tau$ is a frequency domain response vector in an $i^{th}$ frequency band. The characteristic of each frequency domain element of each $L_T$ is $e^{jw\tau}$, where W is N-dimensional and has a linear relationship with frequency domain characteristics corresponding to the reversed order of the first row of the synthesized Toeplitz matrix.

In step S1060, a first preset threshold is compared with inner products between each of the plurality of frequency domain response vectors and the noise space matrix respectively, and a delay corresponding to each of a plurality of frequency domain response vectors in which inner products satisfy the first preset threshold is determined to be a delay of one path in multipath.

Then each of frequency domain response vectors corresponding to multiple delay signals is multiplied with the noise space matrix, each of product results is compared with a first preset threshold, and finally, a delay corresponding to each of multiple frequency domain response vectors which satisfy the first preset threshold is determined to be a delay of one path in the space, thereby achieving multipath separation. Since the noise space matrix is in matrix form, the multiplication of the frequency domain response vectors and the noise space matrix is actually to calculate inner products of the frequency domain response vectors and each of the noise space vectors, and then all the inner products are summed to obtain the product result.

In an embodiment of the present application, the method of comparing the first preset threshold with the inner products between each of the plurality of frequency domain response vectors and the noise space matrix respectively and determining the delay, for example, may be to compare the first preset threshold with reciprocals of the inner products between each of the plurality of frequency domain response vectors and the noise space matrix respectively, and determine a delay corresponding to each of a plurality of frequency domain response vectors in which reciprocals of inner products are greater than a first preset threshold to be a delay of one path in the multipath.

That is, $$p_\tau = \frac{1}{|L_\tau * V0|}$$

is calculated, and whether $p_\tau$ is greater than the first preset threshold b is determined. When $p_{\tau,\tau}$ is greater than the first preset threshold b, a path having a delay of $\tau$ is determined to be an actual path, that is, a signal having the delay of $\tau$ is a signal existing in the space, and $\tau$ is the relative arrival time in the path. The first preset threshold b is determined after the values corresponding to all the delays $p_\tau$ are calculated. After the values corresponding to all the delays $p_\tau$ are calculated, the maximum value of $p_\tau$ is multiplied by a coefficient $\alpha$ to obtain the first preset threshold b, where the coefficient $\alpha$ is determined by simulation results.

The multipath separation method provided by the embodiment of the present application is not limited to be used in positioning. The multipath separation method provided by the embodiment of the present application can be applied to various fields such as signal separation, signal detection, signal estimation, and the like. As long as there is multipath transmission in the space region and the signals are transmitted through multiple discontinuous frequency bands, the multipath separation method provided by the embodiment of the present application can be used to perform multipath separation on the signals, thereby improving the precision of multipath separation.

In the multipath separation method provided by this embodiment, frequency domain response characteristics of received reference signals in at least two different frequency bands are extracted, for each of the at least two different frequency bands, a Toeplitz matrix is constructed according to the frequency domain response characteristics of the reference signal in the respective frequency band, the Toeplitz matrixes corresponding to the at least two different frequency bands are combined into one synthesized Toeplitz matrix, singular value decomposition is performed on the synthesized Toeplitz matrix, a signal space matrix and a noise space matrix are determined according to the decomposed matrix, a plurality of frequency domain response vectors are constructed according to frequency domain response characteristics of local signals having a plurality of different delays and are the same as the received reference signals, a first preset threshold is compared with inner products between each of the plurality of frequency domain response vectors and the noise space matrix respectively, and a delay corresponding to each of a plurality of frequency domain response vectors in which inner products satisfy the first preset threshold is determined to be a delay of one path in multipath, thereby achieving multipath separation. Since the frequency domain response characteristics corresponding to signals in a plurality of different frequency bands are synthesized, the whole bandwidths of the received signals are fully utilized when the frequency domain response characteristics are processed, thereby improving the noise adaptability to multipath separation and improving the precision of multipath separation.

The multipath separation method provided by the embodiment of the present application is illustrated below by using an example of the multipath separation of signals.

Figure 2:
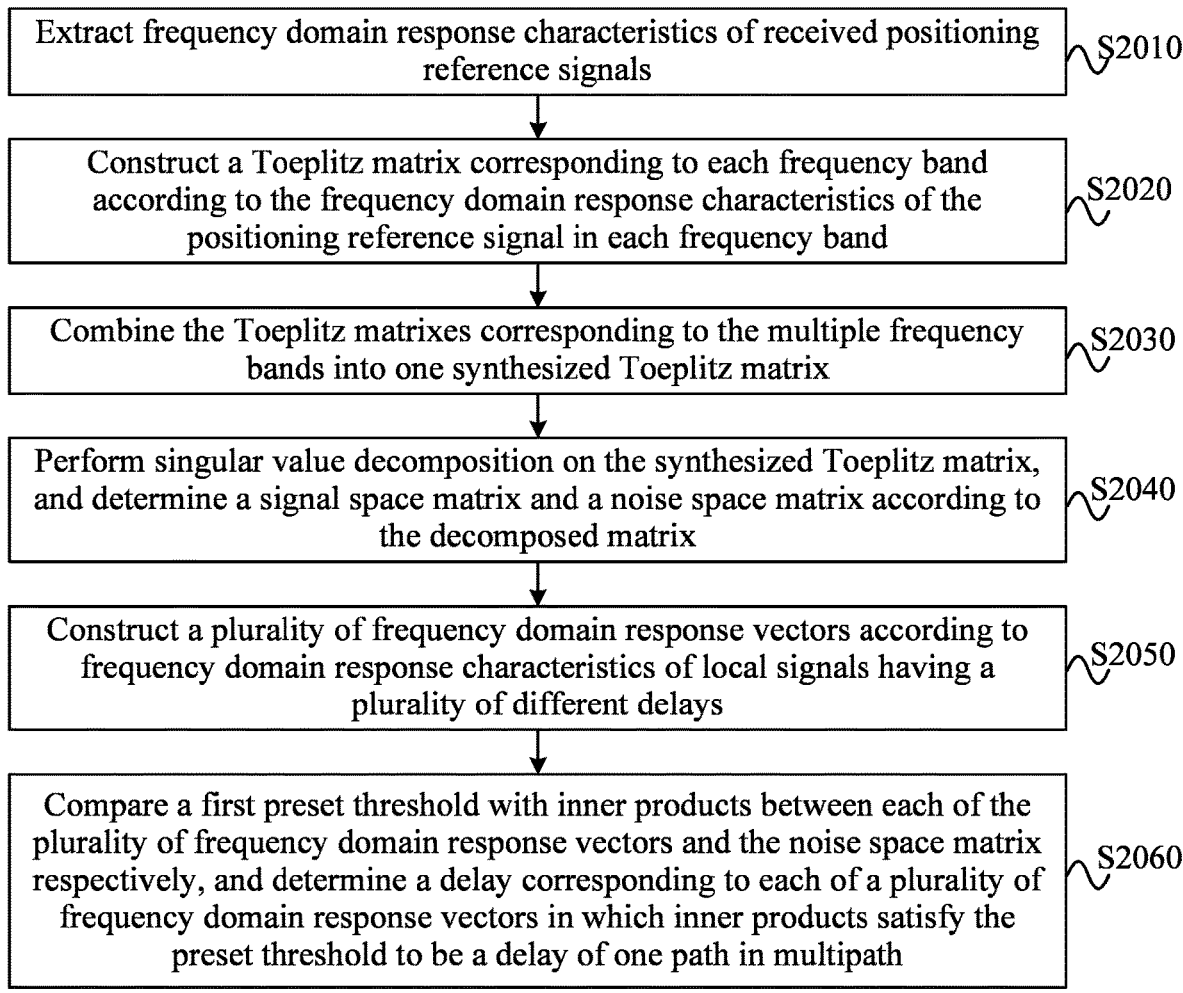
FIG. 2 is a flowchart of another multipath separation method according to an embodiment.

FIG. 2 is a flowchart of another multipath separation method according to an embodiment. The multipath separation method provided by this embodiment is used for multipath separation of positioning reference signals in a Long Term Evolution (LTE) system. As shown in FIG. 2, the method provided by this embodiment includes the steps described below.

In S2010, frequency domain response characteristics of received positioning reference signals are extracted.

According to the configuration of positioning reference signals in the frequency domain in the LTE of the 3rd Generation Partnership Project (3GPP), a single base station has a maximum of 200 sub-carriers in the frequency domain on one symbol in the time domain. This embodiment is illustrated by using an example in which all 200 sub-carriers are used. Of course, the other numbers of sub-carriers are also within the protection scope of the present application. With the influence of zero frequency, 200 sub-carriers are divided into 100 sub-carriers in the left frequency band and 100 sub-carriers in the right frequency band. 100 sub-carriers in the left frequency band and 100 sub-carriers in the right frequency band are divided into two frequency bands, and frequency domain response characteristics (including but not limited to channel characteristics, power characteristics, correlation characteristics, and the like) of the sub-carriers in the left frequency band and the sub-carriers in the right frequency band are extracted respectively. Then the frequency domain response characteristics $H_1(w)$ corresponding to 100 sub-carriers w in the left frequency band and the frequency domain response characteristics $H_2$ corresponding to 100 sub-carriers in the right frequency band are obtained.

In step S2020, a Toeplitz matrix corresponding to each frequency band is constructed according to the frequency domain response characteristics of the positioning reference signal in each frequency band.

In this step, $H_1(w)$ and $H_2$ each need to be constructed into the corresponding Toeplitz matrixes $T_1$ and $T_2$.

$$T_1 = \begin{bmatrix} H_1(w_{N_1}) & H_1(w_{N_1-1}) & \ldots & H_1(w_1) \\ H_1(w_{N_1+1}) & H_1(w_{N_1}) & \ldots & H_1(w_2) \\ \ldots & \ldots & \ldots & \ldots \\ H_1(w_{100}) & H_1(w_{99}) & \ldots & H_1(w_{100-N_1+1}) \end{bmatrix}$$

$$T_2 = \begin{bmatrix} H_2(w_{N_2}) & H_2(w_{N_2-1}) & \ldots & H_2(w_1) \\ H_2(w_{N_2+1}) & H_2(w_{N_2}) & \ldots & H_2(w_2) \\ \ldots & \ldots & \ldots & \ldots \\ H_2(w_{100}) & H_2(w_{99}) & \ldots & H_2(w_{100-N_2+1}) \end{bmatrix}$$

$N_1=N_2$, and the matrixes $T_1$ and $T_2$ have the feature that the elements on the main diagonal are equal and the elements parallel to the main diagonal are also equal.

In step S2030, the Toeplitz matrixes corresponding to the multiple frequency bands are combined into one synthesized Toeplitz matrix.

That is, the matrixes $T_1$ and $T_2$ are combined into an M×N matrix T, where $T=[T_2\ T_1]$, and $N=2N_1=2N_2$.

In step S2040, singular value decomposition is performed on the synthesized Toeplitz matrix, and a signal space matrix and a noise space matrix are determined according to the decomposed matrix.

That is, singular value decomposition is performed on the synthesized Toeplitz matrix $T_{M \cdot N}$, that is, $T_{M \times N} \overset{SVD}{\Longrightarrow} U\Sigma V^H$, to obtain a matrix U which is an M×M matrix, a matrix $\Sigma$ which is an M×N matrix, and a matrix $V^H$ which is an N×N matrix. Then, a matrix composed of a first group column vectors in $V^H$ is used as the signal space matrix, where the first group column vectors in the $V^H$ corresponds to eigenvalues which are in the matrix $\Sigma$ and each of modulus values of which is greater than or equal to a second preset threshold, and a matrix composed of a second group column vectors in $V^H$ is used as the noise space matrix, where the second group column vectors in the $V^H$ corresponds to eigenvalues which are in the matrix $\Sigma$ and each of modulus values of which is less than the second preset threshold.

In step S2050, a plurality of frequency domain response vectors are constructed according to frequency domain response characteristics of local signals having a plurality of different delays.

K frequency domain response vectors $L_k(w)$ with a length of N of local positioning reference signals having different delays $p_\tau$ need to be constructed, where the vector length of each $L_k(w)$ is N, and $k \in \{1, 2, \ldots, K\}$.

The characteristic of each frequency domain element of each $L_k(w)$ is $e^{jw\tau}$, where W is N-dimensional and has a linear relationship with frequency domain characteristics corresponding to the reversed order of the first row of the synthesized Toeplitz matrix $T_{M \cdot N}$. That is $W_{n1}=C_1 \cdot [w1_1\ w1_2 \ldots w1_{N1}]+b_1$ $n1 \in \{1, 2, \ldots N1\}$, where w1 is positions of first N1 frequency domain sub-carriers corresponding to $H_1(w)$. $W_{n2}=C_2 \cdot [w2_1\ w2_2\ \ldots\ w2_{N1}]+b_2$ $n2 \in \{N1+1, N1+2, \ldots N\}$, where w2 is positions of first N1 frequency domain sub-carriers corresponding to $H_2$.

In step S2060, a first preset threshold is compared with inner products between each of the plurality of frequency domain response vectors and the noise space matrix respectively, and a delay corresponding to each of a plurality of frequency domain response vectors in which inner products satisfy the first preset threshold is determined to be a delay of one path in multipath.

The inner products of $L_k(w)$ and each vector in V0 are obtained, the inner products are summed, and then a reciprocal of the sum is obtained, $$P_k = \frac{1}{\sum_{n=1}^{colOfV0} |V0_n \cdot L_K(w)|}.$$

According to a threshold set for $P_k$, $\tau_k$ corresponding to $L_k$ which is greater than the threshold $P_k$ is a delay of one path existing in the space. The threshold $P_k$ is determined after the values of $P_k$ corresponding to all delays are calculated. After $P_k$ corresponding to all delays are calculated, the maximum value of $P_k$ is multiplied by a coefficient $\alpha$ to obtain the threshold, where the coefficient $\alpha$ is determined through simulation results.

Figure 3:
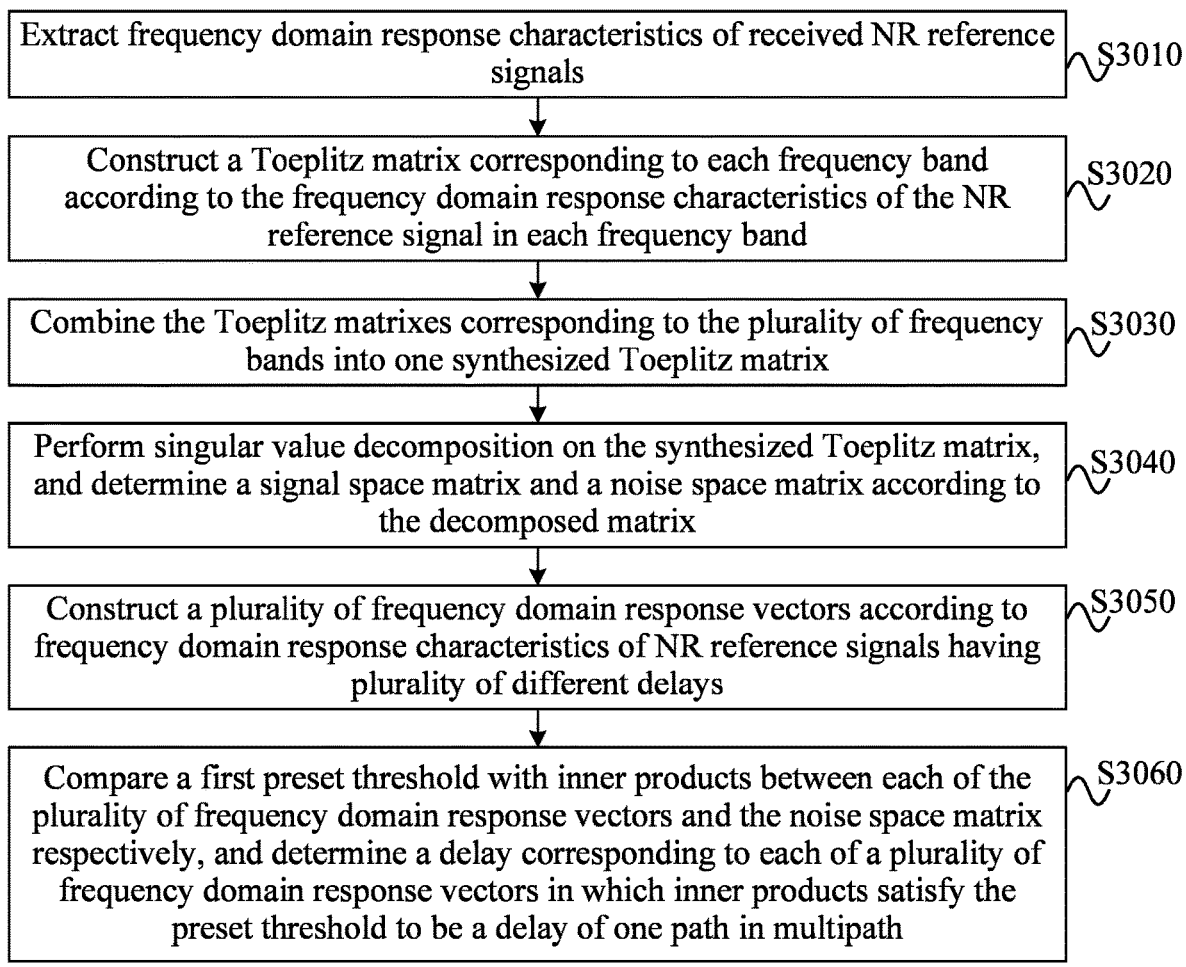
FIG. 3 is a flowchart of another multipath separation method according to an embodiment.

FIG. 3 is a flowchart of another multipath separation method according to an embodiment. The multipath separation method provided by this embodiment is used for multipath separation of new radio (NR) reference signals in 5G. As shown in FIG. 3, the method provided by this embodiment includes the steps described below.

In S3010, frequency domain response characteristics of received NR reference signals are extracted.

According to the signal bandwidth defined in 3GPP, NR reference signals are affected by zero frequency and are divided into a left frequency band and a right frequency band, and the left frequency band and right frequency band each include multiple sub-carriers. There are two frequency bands, that is, the left frequency band and the right frequency band, and the frequency domain response characteristics (including but not limited to channel characteristics, power characteristics, correlation characteristics, and the like) of the sub-carriers in each of the two frequency bands are extracted. Then the frequency domain response characteristics $H_1(w)$ corresponding to the sub-carriers w in the left frequency band and the frequency domain response characteristics $H_2(w)$ corresponding to the sub-carriers in the right frequency band are obtained.

In step S3020, a Toeplitz matrix corresponding to each frequency band is constructed according to the frequency domain response characteristics of the NR reference signal in each frequency band. In this step, $H_1(w)$ and $H_2(w)$ each need to be constructed into the corresponding Toeplitz matrixes $T_1$ and $T_2$.

$$T_1 = \begin{bmatrix} H_1(w_{N_1}) & H_1(w_{N_1-1}) & \ldots & H_1(w_1) \\ H_1(w_{N_1+1}) & H_1(w_{N_1}) & \ldots & H_1(w_2) \\ \ldots & \ldots & \ldots & \ldots \\ H_1(w_M) & H_1(w_{M-1}) & \ldots & H_1(w_{MN_1+1}) \end{bmatrix}$$

$$T_2 = \begin{bmatrix} H_2(w_{N_2}) & H_2(w_{N_2-1}) & \ldots & H_2(w_1) \\ H_2(w_{N_2+1}) & H_2(w_{N_2}) & \ldots & H_2(w_2) \\ \ldots & \ldots & \ldots & \ldots \\ H_2(w_M) & H_2(w_{M-1}) & \ldots & H_2(w_{MN_2+1}) \end{bmatrix}$$

The matrixes $T_1$ and $T_2$ have the feature that the elements on the main diagonal are equal and the elements parallel to the main diagonal are also equal.

In step S3030, the Toeplitz matrixes corresponding to the plurality of frequency bands are combined into one synthesized Toeplitz matrix.

That is, the matrixes $T_1$ and $T_2$ are combined into an M×N matrix T, where $T=[T_2 \; T_1]$, and $N=N_1+N_2$.

In step S3040, singular value decomposition is performed on the synthesized Toeplitz matrix, and a signal space matrix and a noise space matrix are determined according to the decomposed matrix.

That is, singular value decomposition is performed on the synthesized Toeplitz matrix $T_{M \cdot N}$, that is, $T_{M \times N} \xrightarrow{SVD} U\Sigma V^H$, to obtain a matrix U which is an M×M matrix, a matrix $\Sigma$ which is an M×N matrix, and a matrix $V^H$ which is an N×N matrix. Then, a matrix composed of a first group column vectors in $V^H$ is used as the signal space matrix, where the first group column vectors in the $V^H$ corresponds to eigenvalues which are in the matrix $\Sigma$ and each of modulus values of which is greater than or equal to a second preset threshold, and a matrix composed of a second group column vectors in $V^H$ is used as the noise space matrix, where the second group column vectors in the $V^H$ corresponds to eigenvalues which are in the matrix $\Sigma$ and each of modulus values of which is less than the second preset threshold.

In step S3050, a plurality of frequency domain response vectors are constructed according to frequency domain response characteristics of NR reference signals having a plurality of different delays.

K frequency domain response vectors $L_k(w)$ with a length of N of NR reference signals having different delays $p_\tau$ need to be constructed, where the vector length of each $L_k(w)$ is N, and $k \in \{1, 2, \ldots, K\}$.

The characteristic of each frequency domain element of each $L_k(w)$ is $e^{jw\tau_k}$, where W is N-dimensional and has a linear relationship with frequency domain characteristics corresponding to the reversed order of the first row of the synthesized Toeplitz matrix $T_{M \cdot N}$. That is, $W_{n1}=C_1 \cdot [w1_1 \; w1_2 \ldots w1_{N1}]+b_1 \; n1 \in \{1, 2, \ldots N1\}$, where w2 is positions of first N1 frequency domain sub-carriers corresponding to $H_1(w)$. $W_{n2}=C_2 \cdot [w2_1 \; w2_2 \; \ldots \; w2_{N1}]+b_2 \; n2 \in \{N1+1, N1+2, \ldots N\}$, where w2 is positions of first N1 frequency domain sub-carriers corresponding to $H_2(w)$.

In step S3060, a first preset threshold is compared with inner products between each of the plurality of frequency domain response vectors and the noise space matrix respectively, and a delay corresponding to each of a plurality of frequency domain response vectors in which inner products satisfy the first preset threshold is determined to be a delay of one path in multipath.

The inner products of $L_k(w)$ and each vector in V0 are obtained, the inner products are summed, and then a reciprocal of the sum is obtained, $$P_k = \frac{1}{\sum_{n=1}^{colOfV0} |V0_n \cdot L_K|}.$$

According to a threshold set for $P_k$, $p_\tau$ corresponding to $L_k$ which is greater than the threshold $P_k$ is a delay of one path existing in the space. The threshold $P_k$ is determined after the values of $P_k$ corresponding to all delays are calculated. After $P_k$ corresponding to all delays are calculated, the maximum value of $P_k$ is multiplied by a coefficient α to obtain the threshold, where the coefficient α is determined through simulation results.

Figure 4:
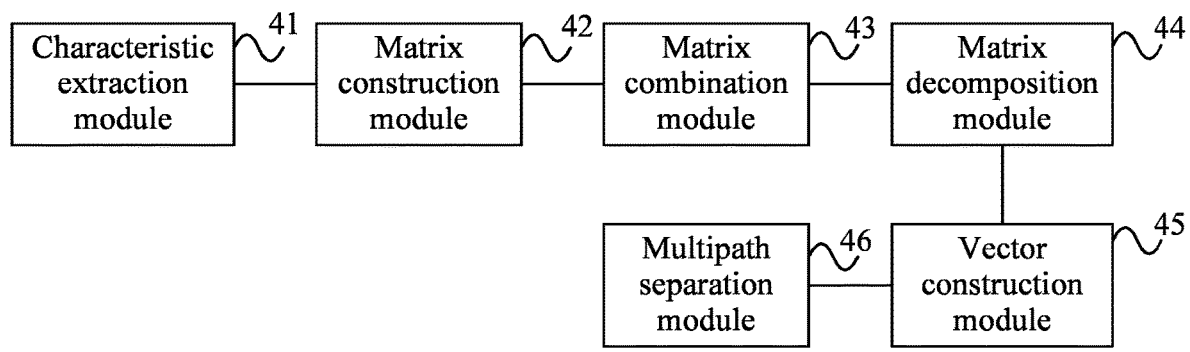
FIG. 4 is a structural diagram of a multipath separation device according to an embodiment.

FIG. 4 is a structural diagram of a multipath separation device according to an embodiment. As shown in FIG. 4, the multipath separation device provided by this embodiment includes a characteristic extraction module 41, a matrix construction module 42, a matrix combination module 43, a matrix decomposition module 44, a vector construction module 45, and a multipath separation module 46. The characteristic extraction module 41 is configured to extract frequency domain response characteristics of received reference signals in at least two different frequency bands. The matrix construction module 42 is configured to, for each of the at least two different frequency bands, construct a Toeplitz matrix according to frequency domain response characteristics of a reference signal in the respective frequency band, where a size of the Toeplitz matrix for each of the at least two different frequency bands is determined according to the number of sub-carriers contained in the respective one of the at least two different frequency bands, and Toeplitz matrixes for the at least two different frequency bands have the same number of rows. The matrix combination module 43 is configured to combine the Toeplitz matrixes corresponding to the at least two different frequency bands into one synthesized Toeplitz matrix. The matrix decomposition module 44 is configured to perform singular value decomposition on the synthesized Toeplitz matrix, and determine a signal space matrix and a noise space matrix according to the decomposed matrix. The vector construction module 45 is configured to construct a plurality of frequency domain response vectors according to frequency domain response characteristics of local signals having a plurality of different delays, where the local signals are the same as the received reference signals. The multipath separation module 46 is configured to compare a first preset threshold with inner products between each of the plurality of frequency domain response vectors and the noise space matrix respectively, and determine a delay corresponding to each of a plurality of frequency domain response vectors in which inner products satisfy the first preset threshold to be a delay of one path in multipath.

The multipath separation device provided in this embodiment is configured to implement the multipath separation method of the embodiment shown in FIG. 1. The implementation principle and technical effects are similar and thus will not be repeated here again.

In an embodiment, in the embodiment shown in FIG. 4, the matrix construction module 42 is configured to, for each of the at least two different frequency bands, construct a Toeplitz matrix $T_{M \times N_i}$ according to the frequency domain response characteristics of the reference signal in the respective frequency band, where M is rows of $T_{M \times N_i}$, $N_i$ is columns of $T_{M \times N_i}$, i is a frequency band identifier and i∈(1, . . . , t), t is a number of frequency bands, and M and $N_i$ are determined according to the number of sub-carriers in a frequency band i.

In an embodiment, in the embodiment shown in FIG. 4, M is determined according to the multipath estimation capability.

In an embodiment, in the embodiment shown in FIG. 4, the matrix combination module 43 is configured to combine Toeplitz matrixes $T_{M \times N_i}$ corresponding to the at least two different frequency bands into one synthesized Toeplitz matrix $T_{M \times N}$, where $$T_{M \times N} = [\, T_{M \times N_t} \quad \cdots \quad T_{M \times N_2} \quad T_{M \times N_1} \,], \text{ and } N = N_1 + N_2 + \ldots + N_t.$$

In an embodiment, in the embodiment shown in FIG. 4, the matrix decomposition module 44 is configured to perform the singular value decomposition on the synthesized Toeplitz matrix $T_{M \times N}$ through $T_{M \times N} \xrightarrow{SVD} U\Sigma V^H$, where U is an M×M matrix, Σ is an M×N matrix, and $V^H$ is an N×N matrix; use a matrix composed of a first group column vectors in the $V^H$ as the signal space matrix, wherein the first group column vectors in the $V^H$ corresponds to eigenvalues which are in the matrix Σ and each of modulus values of which is greater than or equal to a second preset threshold; and use a matrix composed of a second group column vectors in the $V^H$ as the noise space matrix, wherein the second group column vectors in the $V^H$ corresponds to eigenvalues which are in the matrix Σ and each of modulus values of which is less than the second preset threshold.

In an embodiment, in the embodiment shown in FIG. 4, the multipath separation module 46 is configured to compare the first preset threshold with reciprocals of the inner products between each of the plurality of frequency domain response vectors and the noise space matrix respectively, and determine a delay corresponding to each of a plurality of frequency domain response vectors in which reciprocals of inner products are greater than the first preset threshold to be the delay of the one path in the multipath.

Figure 5:
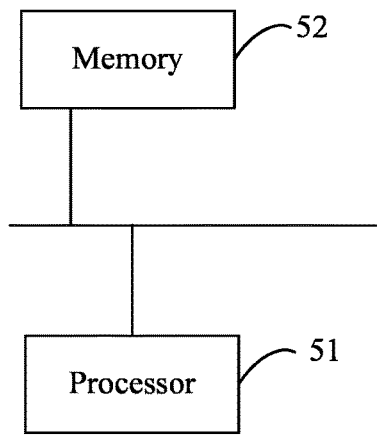
FIG. 5 is a structural diagram of a terminal according to an embodiment.

FIG. 5 is a structural diagram of a terminal according to an embodiment. As shown in FIG. 5, the terminal includes a processor 51 and a memory 51. The number of processors 50 in the terminal may be one or more, and one processor is illustrated as an example in FIG. 5. The processor 51 and the memory 52 in the terminal may be connected through a bus or in other manners, and in FIG. 5, the connection through the bus is illustrated as an example.

The memory 52, as a computer-readable storage medium, may be used for storing software programs, computer executable programs and modules, such as program instructions/modules corresponding to the multipath separation method described in the embodiments of the present application shown in FIGS. 1 to 3 (for example, the characteristic extraction module 41, the matrix construction module 42, the matrix combination module 43, the matrix decomposition module 44, the vector construction module 45, and the multipath separation module 46 in the multipath separation device). The processor 51 runs the software programs, instructions or modules stored in the memory 52 to execute function applications and data processing of the terminal, that is, to implement the multipath separation method described above.

The memory 52 may mainly include a program storage area and a data storage area. The program storage area may store an operating system and an application program required by at least one function while the data storage area may store data created according to the use of the terminal. In addition, the memory 52 may include a high-speed random access memory, or may also include a non-volatile memory such as at least one disk memory, flash memory or other non-volatile solid state memories.

An embodiment of the present application further provides a storage medium containing a computer-executable instructions which are used for implementing a multipath separation method when executed by a processor. The method includes the following steps: frequency domain response characteristics of received reference signals in at least two different frequency bands are extracted; for each of the at least two different frequency bands, a Toeplitz matrix is constructed according to the frequency domain response characteristics of the reference signal in the respective frequency band, where the size of the Toeplitz matrix for each of the at least two different frequency bands is determined according to the number of sub-carriers contained in the respective one of the at least two different frequency bands, and the Toeplitz matrixes for the at least two different frequency bands have the same number of rows; the Toeplitz matrixes corresponding to the at least two different frequency bands are combined into one synthesized Toeplitz matrix; singular value decomposition is performed on the synthesized Toeplitz matrix, and a signal space matrix and a noise space matrix are determined according to the decomposed matrix; a plurality of frequency domain response vectors are constructed according to frequency domain response characteristics of local signals having a plurality of different delays, where the local signals are the same as the received reference signals; and a first preset threshold is compared with inner products between each of the plurality of frequency domain response vectors and the noise space matrix respectively, and a delay corresponding to each of a plurality of frequency domain response vectors in which inner products satisfy the first preset threshold is determined to be a delay of one path in multipath.

The above are only exemplary embodiments of the present application and are not intended to limit the scope of the present application.

It is to be understood by those skilled in the art that the term user equipment encompasses any suitable type of wireless user equipment, such as a mobile phone, a portable data processing device, a portable web browser or a vehicle-mounted mobile station.

Generally, various embodiments of the present application may be implemented in hardware or special purpose circuits, software, logic or any combination thereof. For example, some aspects may be implemented in hardware while other aspects may be implemented in firmware or software that may be executed by a controller, a microprocessor or other computing apparatus, although the present application is not limited thereto.

The embodiments of the present application may be implemented by executing, by a data processor of a mobile apparatus, computer program instructions, for example, in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in the drawings of the present application may represent program steps, or may represent interconnected logic circuits, modules and functions, or may represent a combination of program steps and logic circuits, modules and functions. The computer program may be stored on a memory. The memory may be of any type suitable to the local technical environment and may be implemented using any suitable data storage technology such as, but not limited to, a read-only memory (ROM), a random access memory (RAM), an optical memory apparatus and system (digital video disc (DVD) or compact disc (CD)), and the like. The computer readable medium may include a non-transitory storage medium. The data processor may be of any type suitable to the local technical environment, such as, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

What is claimed is:

1. A multipath separation method, comprising:
   extracting frequency domain response characteristics of received reference signals in at least two different frequency bands;
   for each of the at least two different frequency bands, constructing a Toeplitz matrix according to frequency domain response characteristics of a reference signal in the respective frequency band, wherein a size of the Toeplitz matrix for each of the at least two different frequency bands is determined according to a number of sub-carriers contained in the respective one of the at least two different frequency bands, and Toeplitz matrixes for the at least two different frequency bands have a same number of rows;
   combining the Toeplitz matrixes corresponding to the at least two different frequency bands into one synthesized Toeplitz matrix;
   performing a singular value decomposition (SVD) on the synthesized Toeplitz matrix to obtain a decomposed matrix, and determining a signal space matrix and a noise space matrix according to the decomposed matrix;
   constructing a plurality of frequency domain response vectors according to frequency domain response characteristics of local signals having a plurality of different delays, wherein the local signals are the same as the received reference signals; and
   comparing a first preset threshold with inner products between each of the plurality of frequency domain response vectors and the noise space matrix respectively, and determining a delay corresponding to each of a plurality of frequency domain response vectors in which inner products satisfy the first preset threshold to be a delay of one path in multipath.

2. The method of claim 1, wherein for each of the at least two different frequency bands, constructing the Toeplitz matrix according to the frequency domain response characteristics of the reference signal in the respective frequency band comprises:
   for each of the at least two different frequency bands, constructing a Toeplitz matrix according to the frequency domain response characteristics of the reference signal in the respective frequency band, wherein M is rows of $N_i$ is columns, i is a frequency band identifier and $i \in (1, \ldots, t)$, t is a number of frequency bands, and M and $N_i$ are determined according to a number of sub-carriers in a frequency band i.

3. The method of claim 2, wherein M is determined according to a multipath estimation capability.

4. The method of claim 3, wherein combining the Toeplitz matrixes corresponding to the at least two different frequency bands into the one synthesized Toeplitz matrix comprises:
   combining Toeplitz matrixes corresponding to the at least two different frequency bands into one synthesized Toeplitz matrix wherein and $N=N_1+N_2+ \ldots +N_t$.

5. The method of claim 4, wherein performing the SVD on the synthesized Toeplitz matrix and determining the signal space matrix and the noise space matrix according to the decomposed matrix comprises:
   performing the SVD on the synthesized Toeplitz matrix through $T_{M \times N} \overset{SVD}{\Longrightarrow} U\Sigma V^H$, wherein U is an M×M matrix, $\Sigma$ is an M×N matrix, and $V^H$ is an N×N matrix; using a matrix composed of a first group column vectors in the $V^H$ as the signal space matrix, wherein the first group column vectors in the $V^H$ corresponds to eigenvalues which are in the matrix $\Sigma$ and each of modulus values of which is greater than or equal to a second preset threshold; and
   using a matrix composed of a second group column vectors in the $V^H$ as the noise space matrix, wherein the second group column vectors in the $V^H$ corresponds to eigenvalues which are in the matrix $\Sigma$ and each of modulus values of which is less than the second preset threshold.

6. The method of claim 4, wherein comparing the first preset threshold with the inner products between each of the plurality of frequency domain response vectors and the noise space matrix respectively, and determining the delay corresponding to each of the plurality of frequency domain response vectors in which inner products satisfy the first preset threshold to be the delay of one path in multipath comprises:
   comparing the first preset threshold with reciprocals of the inner products between each of the plurality of frequency domain response vectors and the noise space matrix respectively, and determining a delay corresponding to each of a plurality of frequency domain response vectors in which reciprocals of inner products are greater than the first preset threshold to be the delay of the one path in the multipath.

7. The method of claim 2, wherein combining the Toeplitz matrixes corresponding to the at least two different frequency bands into the one synthesized Toeplitz matrix comprises:
   combining Toeplitz matrixes corresponding to the at least two different frequency bands into one synthesized Toeplitz matrix, wherein and $N=N_1+N_2+ \ldots +N_t$.

8. The method of claim 7, wherein performing the SVD on the synthesized Toeplitz matrix and determining the signal space matrix and the noise space matrix according to the decomposed matrix comprises:
   performing the SVD on the synthesized Toeplitz matrix through $T_{M \times N} \overset{SVD}{\Longrightarrow} U\Sigma V^H$, wherein U is an M×M matrix, $\Sigma$ is an M×N matrix, and $V^H$ is an N×N matrix; using a matrix composed of a first group column vectors in the $V^H$ as the signal space matrix, wherein the first group column vectors in the $V^H$ corresponds to eigenvalues which are in the matrix $\Sigma$ and each of modulus values of which is greater than or equal to a second preset threshold; and using a matrix composed of a second group column vectors in the $V^H$ as the noise space matrix, wherein the second group column vectors in the $V^H$ corresponds to eigenvalues which are in the matrix $\Sigma$ and each of modulus values of which is less than the second preset threshold.

9. The method of claim 7, wherein comparing the first preset threshold with the inner products between each of the plurality of frequency domain response vectors and the noise space matrix respectively, and determining the delay corresponding to each of the plurality of frequency domain response vectors in which inner products satisfy the first preset threshold to be the delay of one path in multipath comprises:

comparing the first preset threshold with reciprocals of the inner products between each of the plurality of frequency domain response vectors and the noise space matrix respectively, and determining a delay corresponding to each of a plurality of frequency domain response vectors in which reciprocals of inner products are greater than the first preset threshold to be the delay of the one path in the multipath.

10. A non-transitory storage medium having a computer program stored thereon, wherein the computer program, when executed by a processor, implements the multipath separation method of claim 1.

11. A multipath separation device, comprising a processor and a storage device, wherein the storage device stores processor-executable programs, and the programs comprise:

a characteristic extraction module, which is configured to extract frequency domain response characteristics of received reference signals in at least two different frequency bands;

a matrix construction module, which is configured to, for each of the at least two different frequency bands, construct a Toeplitz matrix according to frequency domain response characteristics of a reference signal in the respective frequency band, wherein a size of the Toeplitz matrix for each of the at least two different frequency bands is determined according to a number of sub-carriers contained in the respective one of the at least two different frequency bands, and Toeplitz matrixes for the at least two different frequency bands have a same number of rows;

a matrix combination module, which is configured to combine the Toeplitz matrixes corresponding to the at least two different frequency bands into one synthesized Toeplitz matrix;

a matrix decomposition module, which is configured to perform a singular value decomposition (SVD) on the synthesized Toeplitz matrix to obtain a decomposed matrix, and determine a signal space matrix and a noise space matrix according to the decomposed matrix;

a vector construction module, which is configured to construct a plurality of frequency domain response vectors according to frequency domain response characteristics of local signals having a plurality of different delays, wherein the local signals are the same as the received reference signals; and a multipath separation module, which is configured to compare a first preset threshold with inner products between each of the plurality of frequency domain response vectors and the noise space matrix respectively, and determine a delay corresponding to each of a plurality of frequency domain response vectors in which inner products satisfy the first preset threshold to be a delay of one path in multipath.

12. The device of claim 11, wherein the matrix construction module is configured to, for each of the at least two different frequency bands, construct a Toeplitz matrix according to the frequency domain response characteristics of the reference signal in the respective frequency band, wherein M is rows of $N_i$ is columns of i is a frequency band identifier and $i \in (1, \ldots, t)$, t is a number of frequency bands, and M and $N_i$ are determined according to a number of sub-carriers in a frequency band i.

13. The device of claim 12, wherein M is determined according to a multipath estimation capability.

14. The device of claim 13, wherein the matrix combination module is configured to combine Toeplitz matrixes corresponding to the at least two different frequency bands into one synthesized Toeplitz matrix wherein and $N=N_1+N_2+\ldots+N_t$.

15. The device of claim 14, wherein the matrix decomposition module is configured to perform the SVD on the synthesized Toeplitz matrix through $T_{M \times N} \overset{SVD}{=} U\Sigma V^H$, wherein U is an M×M matrix, $\Sigma$ is an M×N matrix, and $V^H$ is an N×N matrix; use a matrix composed of a first group column vectors in the $V^H$ as the signal space matrix, wherein the first group column vectors in the $V^H$ corresponds to eigenvalues which are in the matrix $\Sigma$ and each of modulus values of which is greater than or equal to a second preset threshold; and use a matrix composed of a second group column vectors in the $V^H$ as the noise space matrix, wherein the second group column vectors in the $V^H$ corresponds to eigenvalues which are in the matrix $\Sigma$ and each of modulus values of which is less than the second preset threshold.

16. The device of claim 14, wherein the multipath separation module is configured to compare the first preset threshold with reciprocals of the inner products between each of the plurality of frequency domain response vectors and the noise space matrix respectively, and determine a delay corresponding to each of a plurality of frequency domain response vectors in which reciprocals of inner products are greater than the first preset threshold to be the delay of the one path in the multipath.

17. The device of claim 12, wherein the matrix combination module is configured to combine Toeplitz matrixes corresponding to the at least two different frequency bands into one synthesized Toeplitz matrix wherein and $N=N_1+N_2+\ldots+N_t$.

18. The device of claim 17, wherein the matrix decomposition module is configured to perform the SVD on the synthesized Toeplitz matrix through $T_{M \times N} \overset{SVD}{=} U\Sigma V^H$, wherein U is an M×M matrix, $\Sigma$ is an M×N matrix, and $V^H$ is an N×N matrix; use a matrix composed of a first group column vectors in the $V^H$ as the signal space matrix, wherein the first group column vectors in the $V^H$ corresponds to eigenvalues which are in the matrix $\Sigma$ and each of modulus values of which is greater than or equal to a second preset threshold; and use a matrix composed of a second group column vectors in the $V^H$ as the noise space matrix, wherein the second group column vectors in the $V^H$ corresponds to eigenvalues which are in the matrix $\Sigma$ and each of modulus values of which is less than the second preset threshold.

19. The device of claim 17, wherein the multipath separation module is configured to compare the first preset threshold with reciprocals of the inner products between each of the plurality of frequency domain response vectors and the noise space matrix respectively, and determine a delay corresponding to each of a plurality of frequency domain response vectors in which reciprocals of inner products are greater than the first preset threshold to be the delay of the one path in the multipath.

\* \* \* \* \*